United States Patent
String

(10) Patent No.: US 11,649,116 B2
(45) Date of Patent: May 16, 2023

(54) VERTICAL COIN ROLL CONVEYOR

(71) Applicant: GCCM, LLC, Harrisburg, PA (US)

(72) Inventor: Gregory F. String, Mechanicsburg, PA (US)

(73) Assignee: GCCM, LLC, Harrisburg, PA (US)

( * ) Notice: Subject to any disclaimer, the term of this patent is extended or adjusted under 35 U.S.C. 154(b) by 113 days.

(21) Appl. No.: 17/073,669

(22) Filed: Oct. 19, 2020

(65) Prior Publication Data

US 2022/0119197 A1    Apr. 21, 2022

(51) Int. Cl.
*B65G 17/34* (2006.01)
*B65G 17/46* (2006.01)
*B65G 17/38* (2006.01)
*B65G 17/12* (2006.01)

(52) U.S. Cl.
CPC ........... *B65G 17/123* (2013.01); *B65G 17/34* (2013.01); *B65G 17/38* (2013.01); *B65G 17/46* (2013.01); *B65G 2201/0232* (2013.01); *B65G 2812/02693* (2013.01); *B65G 2812/02752* (2013.01)

(58) Field of Classification Search
None
See application file for complete search history.

(56) References Cited

U.S. PATENT DOCUMENTS

| | | | |
|---|---|---|---|
| 2,774,460 A * | 12/1956 | Spoonhour | B65G 17/12 198/801 |
| 5,022,890 A * | 6/1991 | Rapp | G07D 9/06 453/56 |
| 6,519,921 B1 | 2/2003 | Tsuduru et al. | |
| 7,434,679 B2 | 10/2008 | Swarts | |
| 8,491,430 B1 | 7/2013 | Swartz | |
| 9,437,066 B2 | 9/2016 | String | |
| 2005/0109579 A1* | 5/2005 | Griffin | B65G 17/002 198/465.1 |

FOREIGN PATENT DOCUMENTS

| | | |
|---|---|---|
| CN | 206939656 U | 1/2018 |
| DE | 103533997 A1 | 6/2005 |
| JP | H0258193 A | 2/1990 |
| JP | H03240898 A | 10/1991 |
| JP | 20069225 A | 4/2006 |

OTHER PUBLICATIONS

English-language machine translation of specification of DE 103544997 A1, European Patent Office, 3 pages.
English-language machine translation of specification of JP 20069925 A, European Patent Office, 16 pages.

(Continued)

*Primary Examiner* — Kavel Singh
(74) *Attorney, Agent, or Firm* — Hooker & Habib, P.C.

(57) ABSTRACT

A vertical coin roll conveyor includes a number of coin roll carriers attached to a conveyor belt that moves the carriers along an endless path that includes a vertical ascending or descending portion. Each coin roll carrier is configured to convey a coin roll and includes a support leg that supports the coin roll on the coin roll carrier and a barrier that impedes the coin roll from rolling or sliding off the coin roll conveyor during conveyance of the coin roll along the vertical portion of the conveyor path.

22 Claims, 9 Drawing Sheets

(56) References Cited

OTHER PUBLICATIONS

European Patent Office, English-language machine translation of specification and claims of JP H03240898A, 13 pages.
European Patent Office, English-language machine translation of specification and clams of JP H0258193A, 31 pages.
European Patent Office, English-language machine translation of specification and claims of CN206939656U, 8 pages.
Russian Patent Office, International Search Report in corresponding PCT/US 2021/052264, dated Dec. 2, 2021, 5 pages.

* cited by examiner

VERTICAL COIN ROLL CONVEYOR

FIELD OF THE DISCLOSURE

The disclosure relates generally to conveyors that transport articles along a conveying path, and in particular, to a conveyor for the vertical conveyance of coin rolls (wrapped stacks of coins).

BACKGROUND OF THE DISCLOSURE

Coin wrapping machines wrap stacks of like-diameter coins with coin wrapper sheets and secure the wrapped sheets around the coin stack to form coin rolls. An example of a coin wrapping machine that forms coin rolls is disclosed in Tsuruda et al U.S. Pat. No. 6,519,921. An example of a coin roll formed by a coin wrapping machine is disclosed in the inventor's U.S. Pat. No. 9,437,066 incorporated by reference as if fully set forth herein.

Coin rolls are often moved entirely or partially in a vertical direction from one location to another for storage or further processing. For example, NGZ GeldZauelMachine GmbH & Co. KG DE 10353397 A discloses a sloped coin roll conveyor that transports coin rolls to a packaging machine. The slope of the conveyor requires substantial horizontal movement for a given vertical movement, increasing the required length of the conveyor and the room taken up by the conveyor for a required vertical displacement.

Glory, Ltd JP 200699225 A incorporated by reference as if fully set forth herein discloses a vertical coin roll conveyor that lifts coin rolls vertically along a conveyor path to reduce the room taken up by the conveyor. The coin rolls are supported on sloped plates attached to a conveyor belt. The slope of the plates relative to vertical cause the coin rolls to be urged against the conveyor belt while the coin rolls are being lifted by the conveyor. This "downhill bias" of the coin rolls assure the coin rolls reliably remain against the conveyor belt during vertical transport. The sloped plates, however, obstruct horizontal loading of coin rolls moving towards the conveyor belt.

Thus there is a need for a vertical coin roll conveyor that provides easier loading of the coin rolls onto the conveyor while reliably maintaining the coin rolls on the conveyor during vertical transport.

SUMMARY OF THE DISCLOSURE

Disclosed is a vertical coin roll conveyor that provides easier loading of the coin rolls onto the conveyor while reliably maintaining the coin rolls on the conveyor during vertical transport.

A vertical coin roll conveyor in accordance with the present disclosure includes a conveyor belt movable along a conveyor path. One or more coin roll carriers are attached to the conveyor belt for movement along the conveyor path. Each coin roll carrier is configured to hold a coin roll having at most a maximum diameter.

The conveyor path includes a vertical conveyor portion extending in a vertical direction.

Each coin roll carrier includes a support leg and a front barrier. The support leg is configured to support the coin roll on the coin roll carrier and includes a flat support surface extending away from the conveyor belt to a free end of the support leg. The front barrier is disposed on the support surface.

The support surface is horizontal with respect to the vertical direction when the coin roll carrier is along the vertical conveyor portion of the conveyor path, the front barrier being disposed adjacent to the free end of the support surface. The support surface and the front barrier being configured to enable the coin roll to slide or roll over the front barrier from the free end of the support leg and onto a coin receiving portion of the support surface.

In possible embodiments the coin roll carrier includes an attachment leg that attaches the coin roll carrier to the conveyor belt. The attachment member and the support member may form an "L" shaped body that may be lengths cut from an angle made of metal, plastic, nylon, or other rigid material.

The coin roll body may be configured such that either leg of the body may be chosen as the attachment leg and the other leg then forms the support leg.

The front barrier in possible embodiments has a rounded outer surface. The front barrier may in possible embodiments extend above the support surface a distance not more than twenty-five percent of the maximum coin roll diameter.

Possible embodiments of the vertical coin roll conveyor may include two or more coin roll carriers, each coin roll carrier being configured to carry the same maximum diameter coin roll. In other possible embodiments of the vertical coin roll conveyor the conveyor may include two or more coin roll carriers, each coin roll carrier being configured to hold a maximum diameter coin roll different than the other coin roll carriers. The coin roll carriers for example, may include a set of one or more coin roll carriers sized to hold a maximum diameter coin roll of quarter-dollar coins, a set of one or more coin roll carriers sized to hold a maximum diameter coin roll of nickel coins, a set of one or more coin roll carriers sized to hold a maximum diameter coin roll of penny coins, and a set of one or more coin carriers sized to hold a maximum diameter coin roll of dime coins.

In embodiments the conveyor belt can be formed as a roller chain. The roller chain can include attachment members extending from links of the roller chain that attach the coin roll carriers to the roller chain.

The disclosed vertical coin roll conveyor enables horizontal loading of coin rolls from the front of the coin roll carrier and provides relatively uncomplicated construction and reliable carriage of the coin rolls whether vertically ascending or descending.

Other objects and features of the disclosure will become apparent as the description proceeds, especially when taken in conjunction with the accompanying drawing sheets illustrating one or more illustrative embodiments.

DETAILED DESCRIPTION

Figure 1:
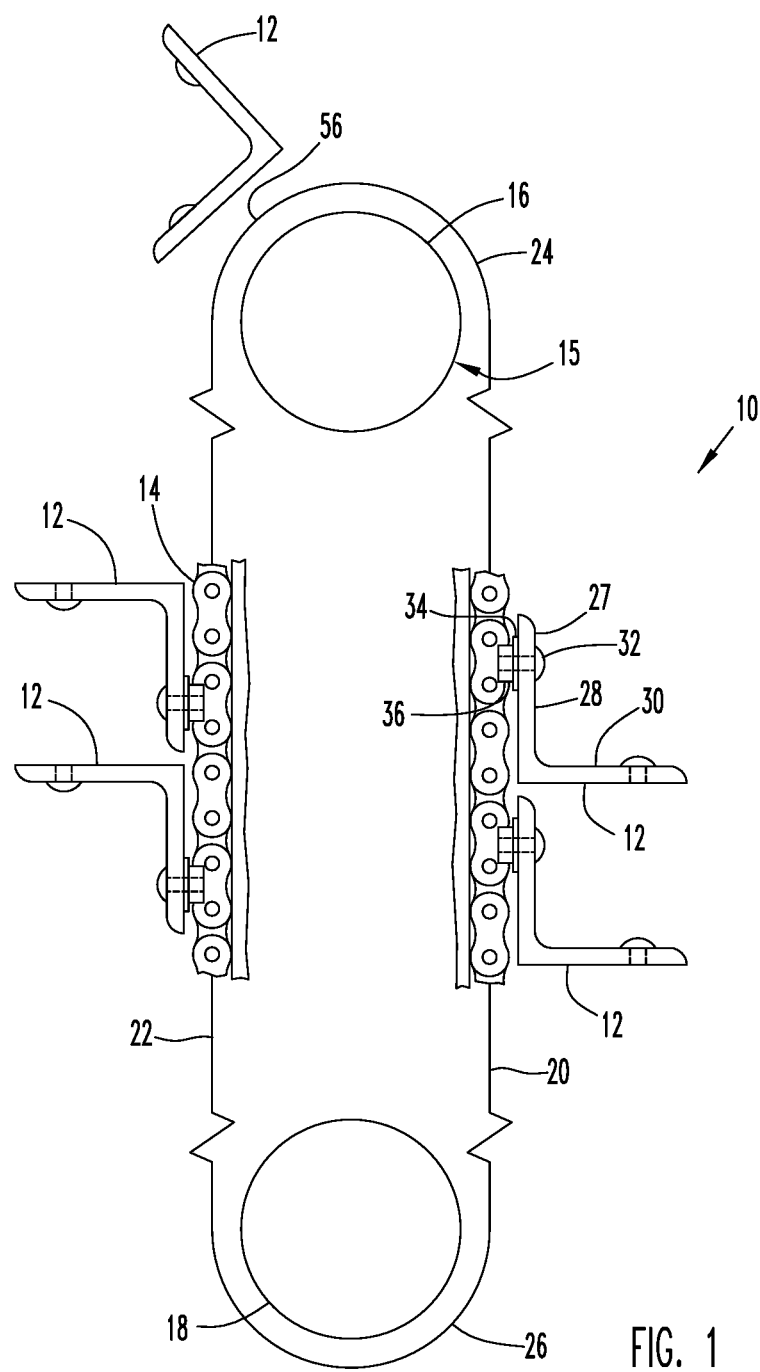
FIG. 1 is a side view of a vertical coin roll conveyor in accordance with this disclosure.

FIG. 1 illustrates a vertical coin roll conveyor 10 in accordance with this disclosure. Although the conveyor is intended for use in transporting coin rolls, it should be understood that the conveyor can be used to convey other types of items, including other types of generally cylindrical or prismatic bodies.

The conveyor 10 includes a number of separate, like coin roll carriers 12 spaced apart along and attached to a conveyor belt formed in the illustrated embodiment as a roller chain 14 of a roller chain assembly. The roller chain is formed of alternating pairs of inner and outer links joined by pins.

The roller chain assembly further includes a drive 15 that drives the conveyor belt along a conveyor path formed as an endless loop. The drive includes an upper chain sprocket 16 vertically spaced above a lower chain sprocket 18 rotatably supported by a stationary frame 19. The roller chain 14 engages and is driven by the chain sprockets along the conveyor path.

Examples of roller chain assemblies that include a roller chain and drive that can be adapted for use with the conveyor 10 are disclosed in Swartz U.S. Pat. No. 7,434,679 and Swartz U.S. Pat. No. 8,491,430, each incorporated by reference as if fully set forth herein. Other types of conveyor belt and conveyor drives can also be adopted to drive the coin roll carriers along the conveyor path.

The roller chain sprockets 16, 18 rotate in a clockwise direction as viewed in FIG. 1. Rotation of the chain sprockets define a respective vertically ascending path portion 20 of the conveyor path and an opposite vertically descending path portion 22 of the conveyor path. The roller chain moves along a flat outer surface of the frame 19 facing and extending along the lifting path portion 20 and moves along an opposite flat outer surface of the frame 19 facing and extending along the descending path portion 22. The ascending path portion and the descending path portions of the conveyor path are connected by an upper curved path portion 24 extending around the upper chain sprocket 16 and a lower curved path portion 26 extending around the lower chain sprocket 18.

Each coin roll carrier includes an "L" shaped body 27 having a flat attachment leg 28 and a flat support 30 extending from and perpendicular to the attachment leg. The carrier body 27 is attached to the roller chain by attaching the attachment leg to the roller chain 14 using a pair of machine screws 32 (see also FIG. 4). The machine screws extend through the leg and through respective bent attachment plates 34 carried by links of the chain roller. The screws are secured by nuts 36 to the brackets.

The illustrated coin roll conveyor 10 is designed for vertical conveyance of standard size coin rolls made up of US quarter dollar coins or smaller US coins. A standard size coin roll of quarter dollar coins contains 40 quarters ($10 worth of coins) and is about two and seven-eighth inches long and about one inch in diameter.

Figure 2:
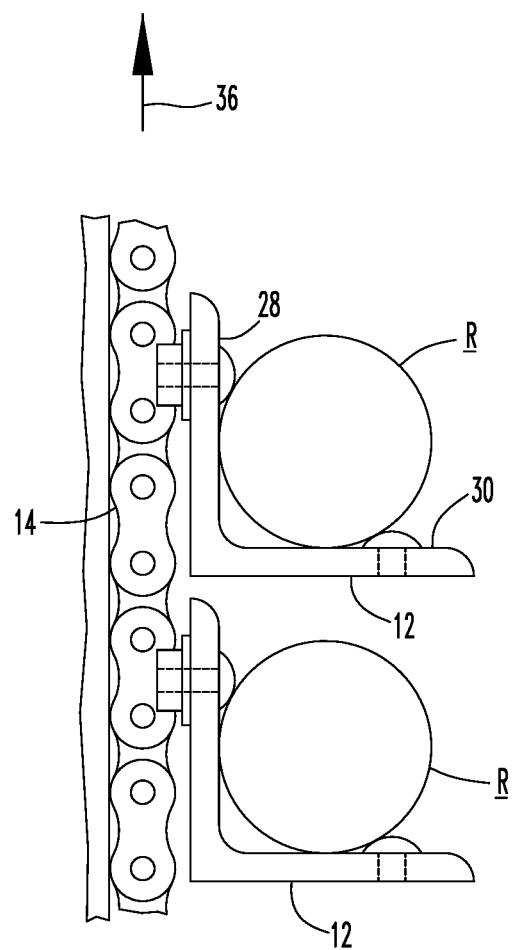
FIG. 2 is an enlarged view of a portion of the vertical coin roll conveyor shown in FIG. 1.

FIG. 2 illustrates a pair of coin roll carriers 12 being conveyed vertically upwardly in the direction of the arrow 36 along the conveyor path vertical ascending path portion 20.

Each coin roll carrier is shown carrying a respective standard size coin roll R of stacked US quarter dollar coins. Each coin roll carrier is attached to the roller chain 14 such that the attachment leg 28 extends from the support leg 30 in essentially a vertical direction parallel with the upward direction 36 while the coin roll carrier is in the vertically ascending conveyor path portion 20. The support leg 30 extends from the attachment leg 28 in essentially a horizontal direction away from the roller chain 14 perpendicular to the upward direction 36 while the coin roll carrier is in the vertically ascending conveyor path portion 20.

Each coin roll carrier 12 is designed to have the coin roll R be received onto the coin roll carrier and being placed in a carrying position with respect to the coin roll carrier. The coin rolls R shown in FIG. 2 are placed in the carrying position on their respective coin roll carriers for vertical transport by the conveyor 10.

Each coin roll carrier 12 further includes additional structure that form one or more barriers resisting movement of the coin roll held by the coin roll carrier out of the carrying position during transport.

The ascending path portion 20 and the descending path portion 22 are vertical path portions that are intended to extend in the vertical direction, that is, extend substantially parallel with the direction of the local force of gravity such that any horizontal component of travel can be considered negligible. The coin roller conveyor 10 then is not intended to rely on gravity urging a coin roll held on the coin roll carrier support leg 30 against the attachment leg 28 while the coin roll carrier is holding a coin roll R and moving in a vertical portion of the conveyor path.

Thus the weight of a coin roll when carried on the coin roll carrier and being conveyed along a vertical path portion would ideally not urge the coin roll to slide or roll with respect to the support leg 30.

But disturbances experienced by the coin roll carrier moving along a vertical path portion or some misalignment of a vertical path portion with respect to vertical could cause the weight of a coin roll held by the coin roll carrier to urge the coin roll to move or slide off the coin roll carrier. The one or more barriers of the coin roll carrier resist or impede movement of the coin roll off the coin roll carrier and retain the coin roll on the coin roll carrier despite transport disturbances or misalignment of the conveyor belt.

Figure 4:
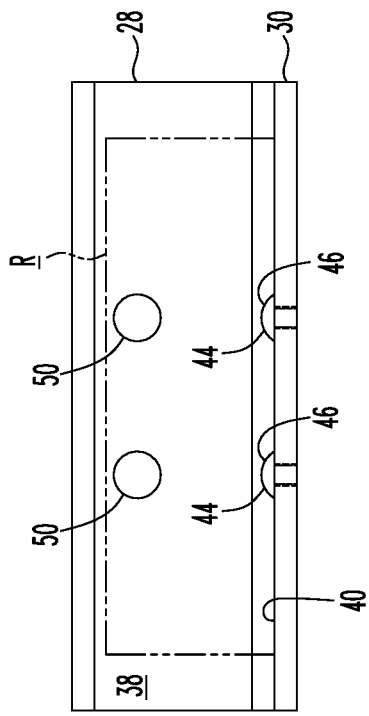
FIGS. 3 and 4 are side and front view of a coin roll carrier of the vertical coin roll conveyor shown in FIG. 1.
Figure 3:
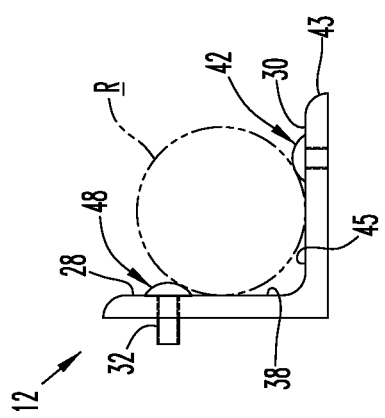

FIGS. 3 and 4 are side and front views of the coin roll carrier 12 that can hold a coin roll R (shown in phantom lines) of stacked US quarter coins. The illustrated coin roll carrier body 27 is a three and one-half inches long piece cut from one-eighth inch thick one and one-quarter inch angle aluminum.

The coin roll R is shown being in the carrying position with respect to the coin roll carrier 12. The coin roll is against a flat inner surface 38 the attachment leg 28 and is supported on a flat inner support surface 40 of the support leg 30.

The coin roll carrier 12 includes a front barrier 42 formed by a pair of spaced apart rounded head machine screws 44 threaded into the support leg 30. The front barrier is adjacent to and extends along a free end 43 of the support leg 30. The front barrier defines a coin roll carrying portion 45 of the support surface 40 extending from the front barrier towards the conveyor belt.

Each illustrated screw 44 has a rounded screw head 46 having a head diameter of 0.262 inches and a height of 0.073 inches. The screw heads are tightened against the inner leg surface 40 and extend above the leg surface. As can be seen in FIGS. 2 and 3, the pair of screw heads 46 are positioned to be centered along and closely spaced from the coin roll R.

The coin roll carrier 12 further includes a top barrier 48 formed by the rounded screw heads 50 of the attachment machine screws 32. The screw heads 50 are identical to the screw heads 46 and are tightened against the inner leg surface 38 and extend above the leg surface. As can be seen in FIGS. 2 and 3, the pair of screw heads 50 are also positioned to be centered along and closely spaced from the coin roll R.

During vertical transport of a coin rolls, the coin roll carrier 12 may have an angular displacement caused by drive variations, changes in speed, or other disturbances that may cause the coin roll R to roll off the support leg 30 while the coin roll carrier is along the ascending portion of the conveyor path.

Figure 5:
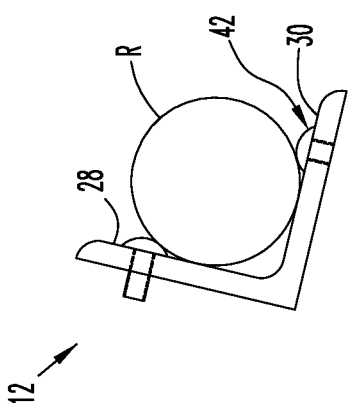
FIG. 5 illustrates angular displacement of the coin roll conveyor shown in FIG. 3.

The front barrier 42 formed by the pair of screw heads 46 impedes rolling of the coin roll R away from the attachment leg 28 and off the support leg 30 during vertical transport of the coin roll on the coin roll carrier. FIG. 5 illustrates angular displacement of the coin roll carrier 12 that urges the coin roll R to roll off the support leg 30. The screw heads forming the front barrier 42 resist displacement of the coin roll and have been found to reliably prevent rolling of the coin roll caused by angular displacement of the support leg below horizontal of up to about 30 degrees.

Although the front barrier 42 is an impediment to free rolling of the coin roll R, the screw heads 44 only extend above the leg surface 40 a distance of approximately 10% of the diameter of the coin roll R. Thus it does not take much force to roll or slide the coin roll over the screw heads 44 when placing the coin roll on the coin roll carrier and to its carrying position where the coin roll is secured by the front barrier 44. Coin rolls can easily be made to roll onto or be pushed onto the support leg 30 and then be secured in the carrying position.

Furthermore, the screw heads 44 form a rounded barrier in which the coin roll can easily begin sliding or rolling onto the screw heads 44 without a sudden change in trajectory or substantial resistance to moving over the front barrier. The rounded screw heads also eliminate sharp corners that might engage the wrapper sheet and rip or tear the sheet.

The free end 43 of the support leg 30 is curved or rounded (see FIG. 3) to facilitate rolling or sliding a coin roll R onto the support surface 40 without substantial obstruction by the free end.

The top barrier 48 impedes vertical displacement of the coin roll R along the attachment leg 28 caused by conveyor disturbances. Vertical displacement could cause the coin roll R to fall on or past the front barrier 42 or to fall back against the support surface 40 with sufficient momentum to roll off the coin roll carrier despite the front barrier 42.

Figure 7:
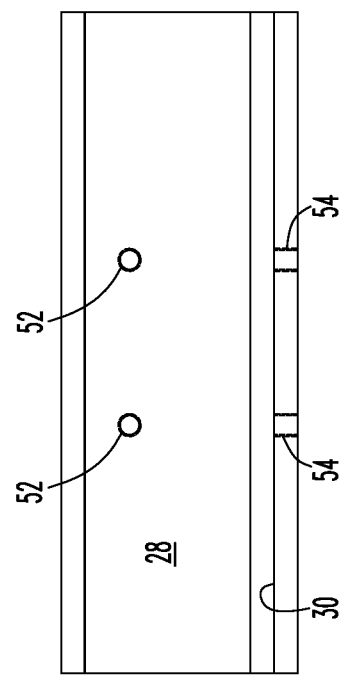
FIGS. 6 and 7 are side and front views of the body of the coin roll carrier shown in FIGS. 3 and 4.
Figure 6:
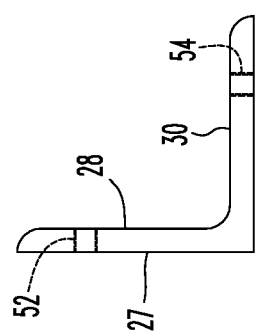

FIGS. 6 and 7 show only the coin roll carrier body 27. The threaded holes 52 in the attachment leg 28 receive the attachment machine screws 34. The threaded holes 54 in the support leg 30 receive the front barrier machine screws 44. The locations of the sets of screw holes 52, 54 are arranged to be symmetrical with another such that either leg of the angle 27 can be used as the attachment leg 28 for ease of construction and simplified inventory.

As can be seen in FIG. 2, the horizontal leg 30 of the coin roll carrier 12 extends along the front of the coin roll carrier when the coin roll carrier is in the ascending portion 20 of the conveyor path and does not obstruct horizontal access to the coin roll carrier from the front of the coin roll carrier for loading coin rolls onto the coin roll carrier.

As the coin roll carrier moves through the upper curved portion 24 of the conveyor path, angular displacement of the coin roll carrier as shown at position 56 along the conveyor path "dumps" the coin roll out of the coin roll carrier. The coin roll can roll over the top barrier 48 and roll off the attachment leg 28 of the coin roll carrier.

The top barrier will initially impede the coin roll from rolling off the coin roll carrier in a manner similar to that caused by the sloped plate of the Glory conveyor but it has been found the coin roll will roll off the coin roll carrier before the coin roll carrier enters the descending portion of the conveyor path. A pivotal gate can be used to receive the coin roll off the coin roll carrier as used in the Glory conveyor or the coin roll could be received directly in a container or receptacle. If desired, mechanical extraction of the coin roll from the coin roll carrier can be used to remove the coin roll from the coin roll carrier.

Figure 8:
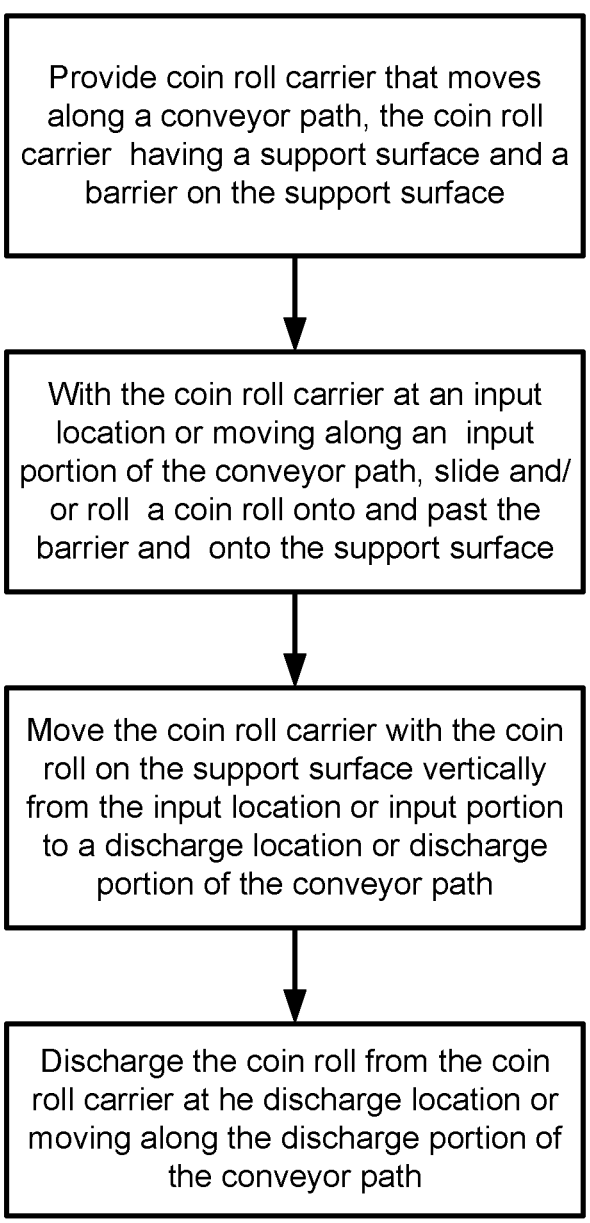
FIG. 8 illustrates the method for vertical conveyance of coin rolls using the coin roll carrier shown in FIGS. 3 and 4.

FIGS. 1 and 2 illustrate a coin roll carrier carrying out the method illustrated in FIG. 8. The coin roll carrier moves along a conveyor path, the coin roll carrier having a support surface and a barrier on the support surface. With the coin roll carrier at an input location or moving along an input portion of the conveyor path, a coin roll is slid or rolled onto and past the barrier and onto the support surface. The coin roll carrier with the coin roll on the support surface then moves vertically from the input location or input portion to a spaced apart discharge location or discharge portion of the conveyor path. The coin roll is then discharged from the coin roll carrier at the discharge location or while the coin roll carrier is moving along the discharge portion of the conveyor path.

The coin roll carrier 10 can be used to raise and/or lower coin rolls. FIG. 2 illustrates moving the coin roll carrier 12 holding the coin roll R along the ascending portion of the conveyor path before discharging the coin roll, that is, the input location or input portion of the conveyor path is vertically below the discharge location or discharge portion. In other embodiments the coin roll carrier 12 the direction of rotation of the sprockets 16, 18 can be reversed so that the coin roll carriers 12 hold the coin roll R in a vertically descending portion of the conveyor path, that is, that is, the input location or input portion of the conveyor path can be vertically above the discharge location or discharge portion. The discharge location or discharge portion can be located along the lower curved portion 26 of the conveyor path.

Coin rolls can be loaded onto or discharged from a coin roll carrier 12 while the coin roll carrier is moving along the conveyor path, or the coin rolls can be loaded onto or discharged from the coin roll carrier while the coin roll carrier is temporarily stopped on the conveyor path.

Figure 9:
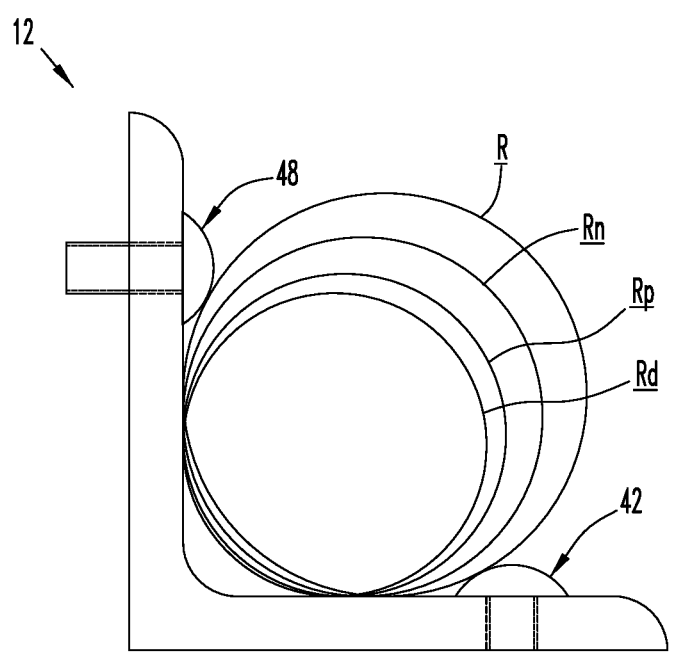
FIG. 9 illustrates the capability of the coin roll carrier shown in FIG. 3 in holding different diameter coin rolls.

FIG. 9 compares a dime coin roll Rd, a penny coin roll Rp, a nickel coin roll Rn, and a quarter-dollar coin roll R each located in the carrier position on the coin roll carrier 12. The smaller diameter penny, dime, and nickel coin rolls are spaced away from the front barrier and top barrier. Use of the coin roll conveyor 10 to convey these smaller coin rolls has, however, been successful. It is believed the smaller diameter coin rolls are sufficiently close to the front barrier 42 and the top barrier 48 to not achieve sufficient momentum to move past the barriers with typically experienced conveyor disturbances or misalignment.

The relative height of the front barrier 42 with respect to coin roll diameter is inversely proportional to the diameter of the coin roll. As mentioned above the front barrier 42 extends above the support surface 40 by about 10% the diameter of the quarter-dollar coin roll R. The front barrier extends above the support surface 40 by about 11% of the diameter of the dime coin roll Rn. Thus even a dime coin roll can be easily rolled or slid on and over the front barrier 42.

It is believed that the front barrier extending above the support surface by no more than 20% of the diameter of the smallest diameter coin roll to be carried by the coin roll carrier provides a reasonable compromise between ease of loading and discharge and security of the coin roll on the coin roll carrier. The front barrier should be tangential to or substantially tangential to the initial point of contact of the front barrier with a coin roll sliding or rolling onto the support leg for a smooth transition of the coin roll onto the front barrier.

FIG. 9 illustrates a coin roll carrier 12 optimized to carry a quarter-dollar coin roll R can also carry smaller diameter coin rolls. Optionally however, a coin roll drive could include coin roll carriers optimized to carry respective coin rolls of different diameters (usually in practice the values associated with a set of coins are each associated with a different coin diameter). The front barrier of each different coin roll carrier would be closely spaced to an associated coin roll carried on the coin roll carrier.

Figure 10:
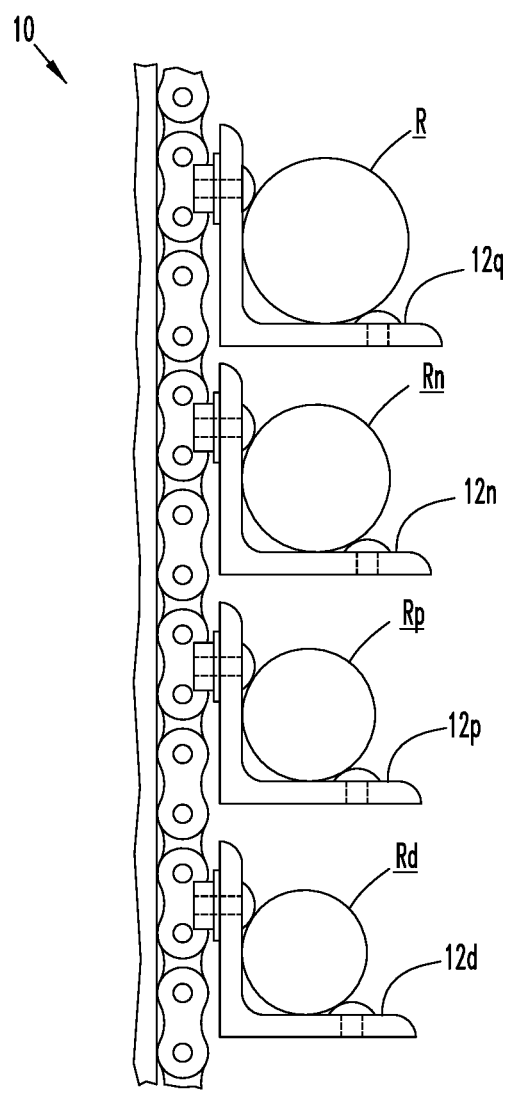
FIG. 10 illustrates the coin roll conveyor shown in FIG. 1 modified to carry coin roll carriers optimized for different diameter coin rolls.

FIG. 10 illustrates the coin roll conveyor 10 modified to include a quarter-dollar coin roll carrier 12q carrying a quarter-dollar coin roll R, a nickel coin roll carrier 12n carrying a nickel coin roll Rn, a penny coin roll carrier 12p carrying a penny coin roll Rp, and a dime coin roll carrier 12d carrying a dime coin roll Rd. Carriers 12q, 12n, 12p may also be used to transport coin rolls of smaller diameter coins. For example, the nickel coin roll carrier 12n could also carry penny coin rolls or dime coin rolls. Automatic controls and sensors can be provided to identify the different sizes of coin roll carrier and to only load an appropriate sized coin roll on the coin roll carrier. Multiple loading locations could be provided, each dedicated to its own respective coin roll denomination or sets of coin roll denominations.

Figure 12:
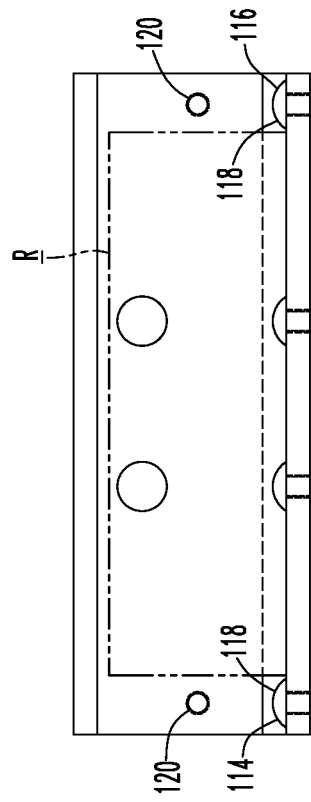
FIGS. 11 and 12 are side and front views of a second embodiment coin roll carrier.
Figure 11:
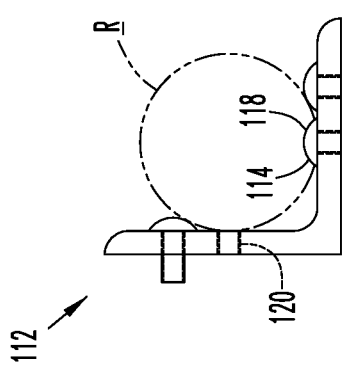

FIGS. 11 and 12 illustrate a second embodiment coin roll carrier 112 that is similar to the coin roll carrier 12 but includes a left coin roll barrier 114 and a right coin roll barrier 116 located near and centered with opposite ends of a quarter-dollar coin roll R (shown in phantom lines in FIGS. 10 and 11) carried on the coin roll carrier. The right and left barriers resist lateral displacement of the coin roll R and help further secure the coin roll on the coin roll carrier. In the illustrated embodiment the left and right barriers are formed from the rounded screw heads of machine screws 118 threaded into the carrier body 27. The machine screws 118 are identical to the machine screws 44. Additional threaded holes 120 are provided on the first leg 28 if the first leg is used as the attachment leg mounting the coin roll carrier to the roller chain 14.

Figure 14:
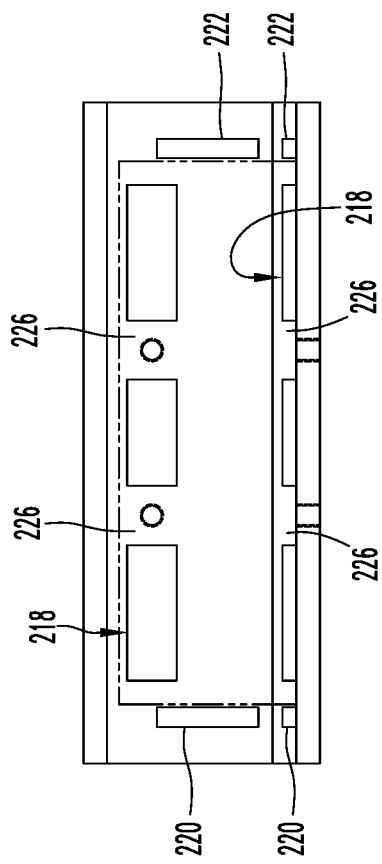
FIGS. 13 and 14 are side and front views of a body for a third embodiment coin roll carrier.
Figure 13:
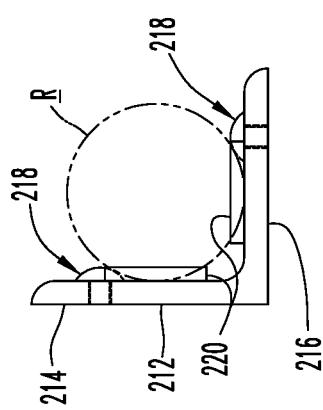

FIGS. 13 and 14 illustrate a third embodiment coin roll carrier body 212 similar to the coin roll carrier body 27 but includes barriers that can be integrally formed or attached to the carrier body 212. While conveying a coin roll the barriers form the front barrier, the top barrier, the left barrier, and the right barrier of the coin roll carrier. The carrier body includes some redundant side barriers that enables use of either leg of the carrier body to function as the attachment leg of the coin roll carrier that fastens the coin roll carrier to the roller chain 14 and the other leg of the coin roll carrier to function as the support leg supporting the coin roll carried on the coin roll carrier.

The carrier body 212 includes a first leg 214 and a second leg 216. Disposed on each leg is an elongate barrier 218 being disposed on the inner surface of the leg to extend along the coin stack of a coin roll being carried on the body. Also disposed on each leg are a pair of spaced apart barriers 220, 222 being disposed on the inner surface of the leg coin roll and spaced to receive between them a coin roll carried on the body.

The elongate barriers 218 form the front barrier and the top barrier of the coin roll carrier 224 that includes the body 212. The elongate barriers each have rounded cross section similar in shape to the rounded head of a machine screw 46 to enable the coin roll to move over the barrier when moving onto or off of the coin roll carrier. Each barrier 218 includes a pair of gaps 226 and 228 that provide space for the attachment machine screws that attach the coin roll carrier to the chain drive 14.

In FIGS. 13 and 14 the leg 214 is selected as the attachment leg and leg 216 as the support leg. The elongate barrier 218 on the first leg 214 forms the top barrier and the elongate barrier 218 on the second leg 216 forms the front barrier. The barriers are disposed and cooperate in the same manner as the front barrier 42 and the top barrier 48 of the coin roll carrier 12 to similarly secure a coin roll held in a carrying position on the coin roll carrier.

In FIGS. 13 and 14 the barriers 220, 222 on the second leg 216 form the right barrier and the left barrier resisting lateral movement of a coin roll in like manner as the right barrier 114 and the left barrier 116 of the coin roll carrier 112. The barriers 220, 222 on the leg 214 are not used.

In this embodiment each of the barriers 220, 222 have a rectangular cross section because the coin rolls will not move over those barriers during insertion and removal of the coin roll to and from the coin roll carrier. The barriers 220, 222 can have similar cross sections as the barriers 218 if side loading or side removal of coin rolls from the coin roll carrier is desired.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art including (but not limited to) changes in material selection, conveyor belt construction, conveyor size and vertical height, number and embodiments of coin roll carriers, and the like, as well as such changes and alterations that fall within the purview of the following claims.

What is claimed is:

1. A vertical coin roll conveyor for the vertical conveyance of coin rolls between vertically-spaced apart locations, the coin roll conveyor comprising:

a conveyor belt movable along a conveyor path and a plurality of coin roll carriers attached to the conveyor belt for movement along the conveyor path, each coin roll carrier being configured to hold a coin roll having at most a maximum diameter;

the conveyor path comprising a vertical conveyor portion extending in a straight-line vertical direction, the coin roll carriers ascending when moving along the vertical conveyor portion;

each coin roll carrier comprising a support leg and a front barrier, the support leg being configured to support the coin roll on the coin roll carrier and comprising a flat support surface extending away from the conveyor belt to a free end of the support leg, the front barrier being disposed on the support surface;

the support surface being horizontal with respect to the vertical direction when the coin roll carrier is along the vertical conveyor portion of the conveyor path, the front barrier being disposed adjacent to the free end of the support surface, and the front barrier being configured to enable the coin roll to roll over a curved surface of the front barrier from the free end of the support leg and onto a coin receiving portion of the support surface after rolling over the front barrier.

2. The vertical coin roll conveyor of claim 1 wherein the front barrier is formed from a plurality of spaced apart members.

3. The vertical conveyor of claim 2 wherein the plurality of members is a plurality of rounded members having convex outer surfaces.

4. The vertical conveyor of claim 3 wherein the plurality of rounded members is a plurality of screw heads.

5. The vertical conveyor of claim 1 wherein the front barrier is an elongate member extending adjacent to the free end of the support surface.

6. The vertical conveyor of claim 5 comprising one or more gaps in the front barrier, through-holes being disposed in the support leg in the gaps.

7. The vertical conveyor of claim 1 wherein the front barrier is disposed on the surface to be closely spaced from a maximum diameter coin roll on the coin receiving portion of the support surface.

8. The vertical conveyor of claim 1 wherein each coin roll carrier includes an attachment leg extending from the support leg and attached to the conveyor belt, the attachment leg and the support leg cooperatively forming an "L"-shaped body.

9. The vertical conveyor of claim 8 wherein the attachment leg comprises an inner surface, the inner surface of the attachment leg and the support surface of the support leg on the inside of the "L"-shaped body, the attachment leg comprising a top barrier extending from the an inner surface of the attachment leg wherein a coin roll on the coin receiving portion of the support surface is disposed between the top and front barriers.

10. The vertical conveyor of claim 9 wherein the top and front barriers are disposed to be closely spaced from a maximum diameter coin roll being disposed on the coin receiving portion of the support surface to impede movement of a coin roll on the coin receiving surface.

11. The vertical conveyor of claim 1 wherein the front barrier extends above the support surface a distance not more than twenty five percent of the coin roll maximum diameter.

12. The vertical conveyor of claim 11 wherein the front barrier extends above the support surface a distance not more than eleven percent of the coin roll maximum diameter.

13. The vertical conveyor of claim 1 wherein each coin roll carrier of the plurality of coin roll carriers is configured to hold the same maximum diameter coin roll.

14. The vertical conveyor of claim 1 wherein the conveyor belt is a roller chain.

15. The vertical conveyor of claim 1 wherein each coin roll carrier of the plurality of coin roll carriers is configured to hold a US quarter-dollar coin roll as the maximum diameter coin roll.

16. The vertical conveyor of claim 1 wherein the plurality of coin roll carriers includes respective sets of coin roll carriers, each respective set being configured to hold a maximum diameter coin roll, each set being a different maximum diameter.

17. The vertical conveyor of claim 16 wherein the respective sets of coin roll carriers comprise at least two sets of coin roll carriers, the at least two sets of coin roll carriers each being configured to hold as a maximum diameter coin roll a respective one of the following (a), (b), (c), and (d): a quarter-dollar coin roll, a nickel coin roll, a penny coin roll, and a dime coin roll.

18. A method for vertical conveyance of a coin roll on a coin roll carrier, the method comprising the steps of:
providing a coin roll carrier that moves along a conveyor path, the conveyor path comprising a vertical conveyor path portion extending in a straight-line vertical direction, the coin roll carrier ascending when moving along the vertical conveyor portion, the coin roll carrier comprising a support surface and a first barrier on the support surface;
with the coin roll carrier at an input location on the vertical conveyor path portion or moving along an input portion of the vertical conveyor path portion, rolling a coin roll onto a curved outer surface of the first barrier and past the first barrier and onto the support surface, the support surface being horizontal when rolling the coin roll onto the support surface;
conveying the coin roll carrier with the coin roll on the horizontal support surface vertically from the input location or input portion some vertical distance to a discharge location or discharge portion of the conveyor path; and
discharging the coin roll from the coin roll carrier at the discharge location or long the discharge portion of the conveyor path.

19. The method of claim 18 wherein discharging the coin roll from the coin roll carrier comprises moving or sliding the coin roll onto and past a second barrier and off the coin roll carrier.

20. The method of claim 19 wherein the first and second barriers impede movement of the coin roll on the coin support surface with respect to the coin support surface during conveyance of the coin roll.

21. A vertical coin roll conveyor for the vertical conveyance of coin rolls, the coin roll conveyor comprising:
a conveyor belt movable along a conveyor path and a plurality of coin roll carriers attached to the conveyor belt for movement along the conveyor path, each coin roll carrier being configured to hold a coin roll having at most a maximum diameter;
the conveyor path comprising a vertical conveyor portion extending in a vertical direction;
each coin roll carrier comprising a support leg and a front barrier, the support leg being configured to support the coin roll on the coin roll carrier and comprising a flat support surface extending away from the conveyor belt to a free end of the support leg, the front barrier being disposed on the support surface, the front barrier being disposed on the surface to be closely spaced from a maximum diameter coin roll on the coin receiving portion of the support surface, the support surface being horizontal with respect to the vertical direction when the coin roll carrier is along the vertical conveyor portion of the conveyor path, the front barrier being disposed adjacent to the free end of the support surface, the support surface and the front barrier being configured to enable the coin roll to slide or roll over the front barrier from the free end of the support leg and onto a coin receiving portion of the support surface; and
each coin roll carrier further comprising an attachment leg extending from the support leg and attached to the conveyor belt, the attachment leg and the support leg cooperatively forming an "L"-shaped body, the attachment leg comprising an inner surface, the inner surface of the attachment leg and the support surface of the support leg on the inside of the "L"-shaped body, the attachment leg comprising a top barrier extending from the an inner surface of the attachment leg wherein a coin roll on the coin receiving portion of the support surface is disposed between the top and front barriers.

22. The vertical conveyor of claim 21 wherein the top and front barriers are disposed to be closely spaced from a maximum diameter coin roll being disposed on the coin receiving portion of the support surface to impede movement of a coin roll on the coin receiving surface.

* * * * *